(12) United States Patent
Kim

(10) Patent No.: US 8,161,915 B2
(45) Date of Patent: Apr. 24, 2012

(54) APPARATUS FOR PREVENTING ANIMAL FROM BARKING AND METHOD OF CONTROLLING THE SAME

(76) Inventor: Yong Won Kim, Seoul (KR)

( * ) Notice: Subject to any disclaimer, the term of this patent is extended or adjusted under 35 U.S.C. 154(b) by 283 days.

(21) Appl. No.: 12/689,303

(22) Filed: Jan. 19, 2010

(65) Prior Publication Data

US 2011/0174236 A1    Jul. 21, 2011

(51) Int. Cl.
*A01K 15/02* (2006.01)

(52) U.S. Cl. .................. 119/718; 119/719; 119/908

(58) Field of Classification Search .............. 119/712, 119/718, 719, 720, 905, 908, 859, 174; 340/573.1, 340/573.3
See application file for complete search history.

(56) References Cited

U.S. PATENT DOCUMENTS

| | | | | |
|---|---|---|---|---|
| 4,180,013 A | * | 12/1979 | Smith | 119/718 |
| 4,947,795 A | * | 8/1990 | Farkas | 119/718 |
| 5,601,054 A | * | 2/1997 | So | 119/718 |
| 5,927,233 A | * | 7/1999 | Mainini et al. | 119/718 |
| 6,058,889 A | * | 5/2000 | Van Curen et al. | 119/721 |
| 6,431,121 B1 | * | 8/2002 | Mainini et al. | 119/718 |
| 6,588,376 B1 | * | 7/2003 | Groh | 119/860 |
| 6,668,760 B2 | * | 12/2003 | Groh et al. | 119/718 |
| 6,830,013 B2 | * | 12/2004 | Williams | 119/765 |
| 6,928,958 B2 | * | 8/2005 | Crist et al. | 119/718 |
| 7,222,589 B2 | * | 5/2007 | Lee et al. | 119/718 |

* cited by examiner

*Primary Examiner* — T. Nguyen
(74) *Attorney, Agent, or Firm* — Lucas & Mercanti, LLP

(57) ABSTRACT

Disclosed herein is an apparatus for preventing an animal and method of controlling the apparatus. The apparatus includes a sound sensor for sensing a bark of an animal and converting the bark into an electrical signal. An amplifier amplifies the electrical signal. A vibration sensor senses a vibration occurring on a neck of the animal. A microprocessor performs control such that, when signals are input from the sound sensor and the vibration sensor, voice, ultrasonic or low-frequency stimulation means is output, and has an auto-variable output function and a time band-based output function. A first control switch allows the user to optionally set a type and a stimulation intensity of the stimulation means. A second control switch allows the user to optionally set a time for which the stimulation means is operated. An output unit receives control signals for the stimulation means and outputs corresponding stimulations.

4 Claims, 7 Drawing Sheets

[Figure 1]
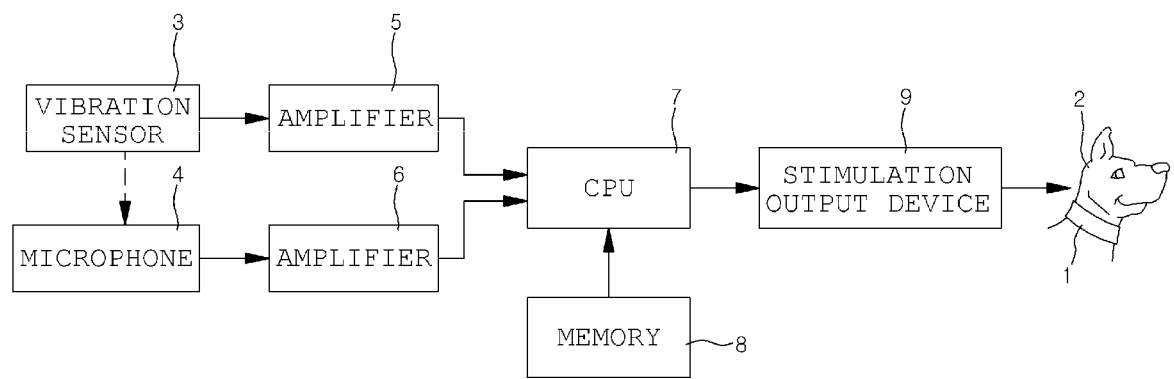

[Figure 2]
(a)
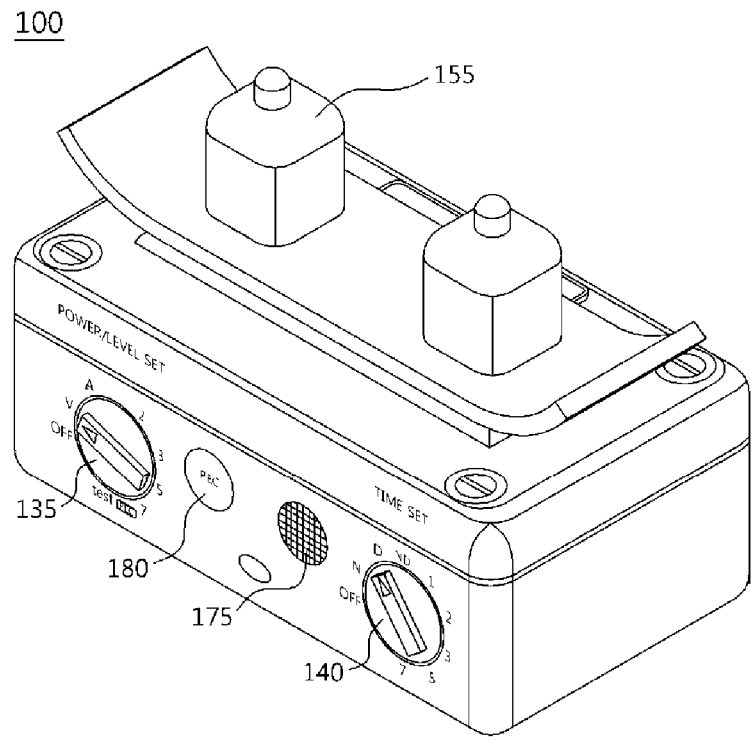
(b)
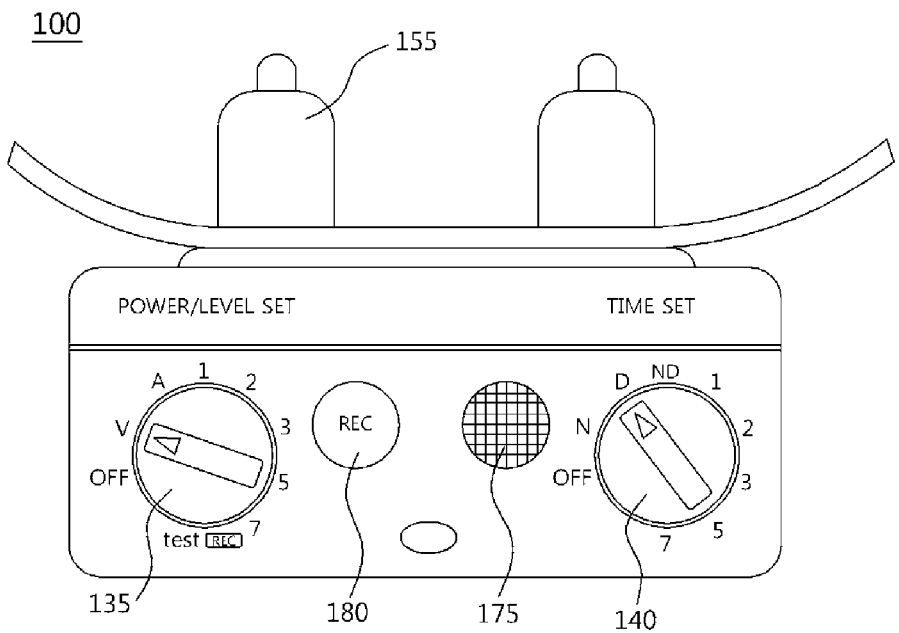

[Figure 2 Continued]
(c)
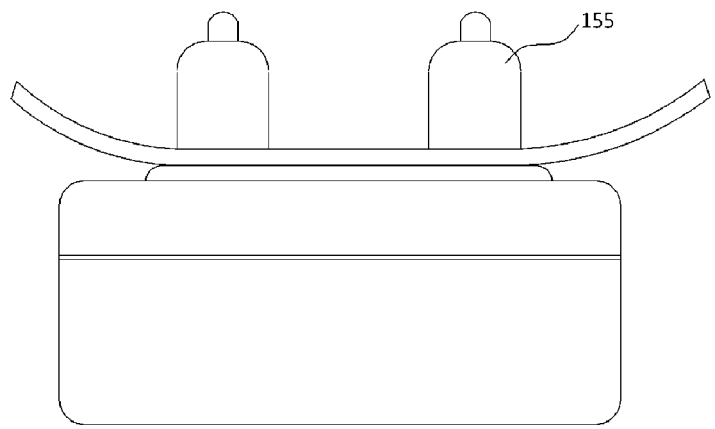
(d)
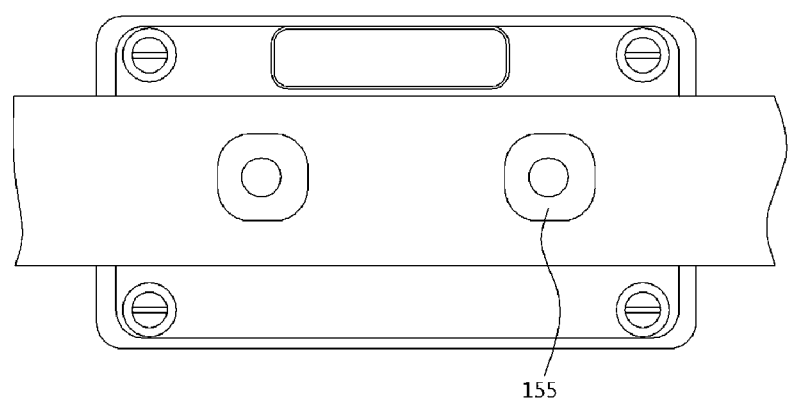
(e)
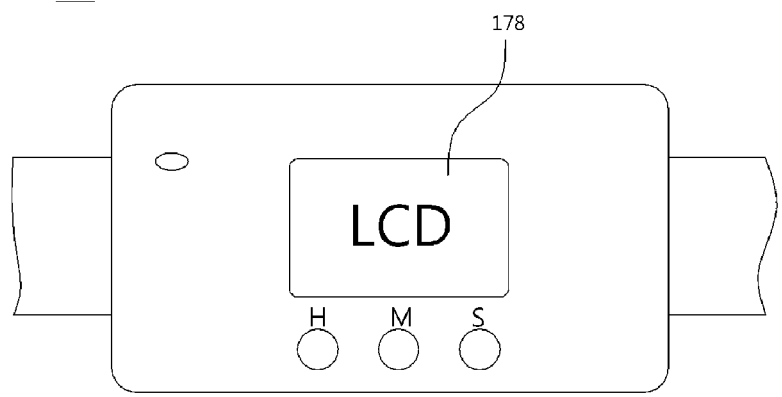

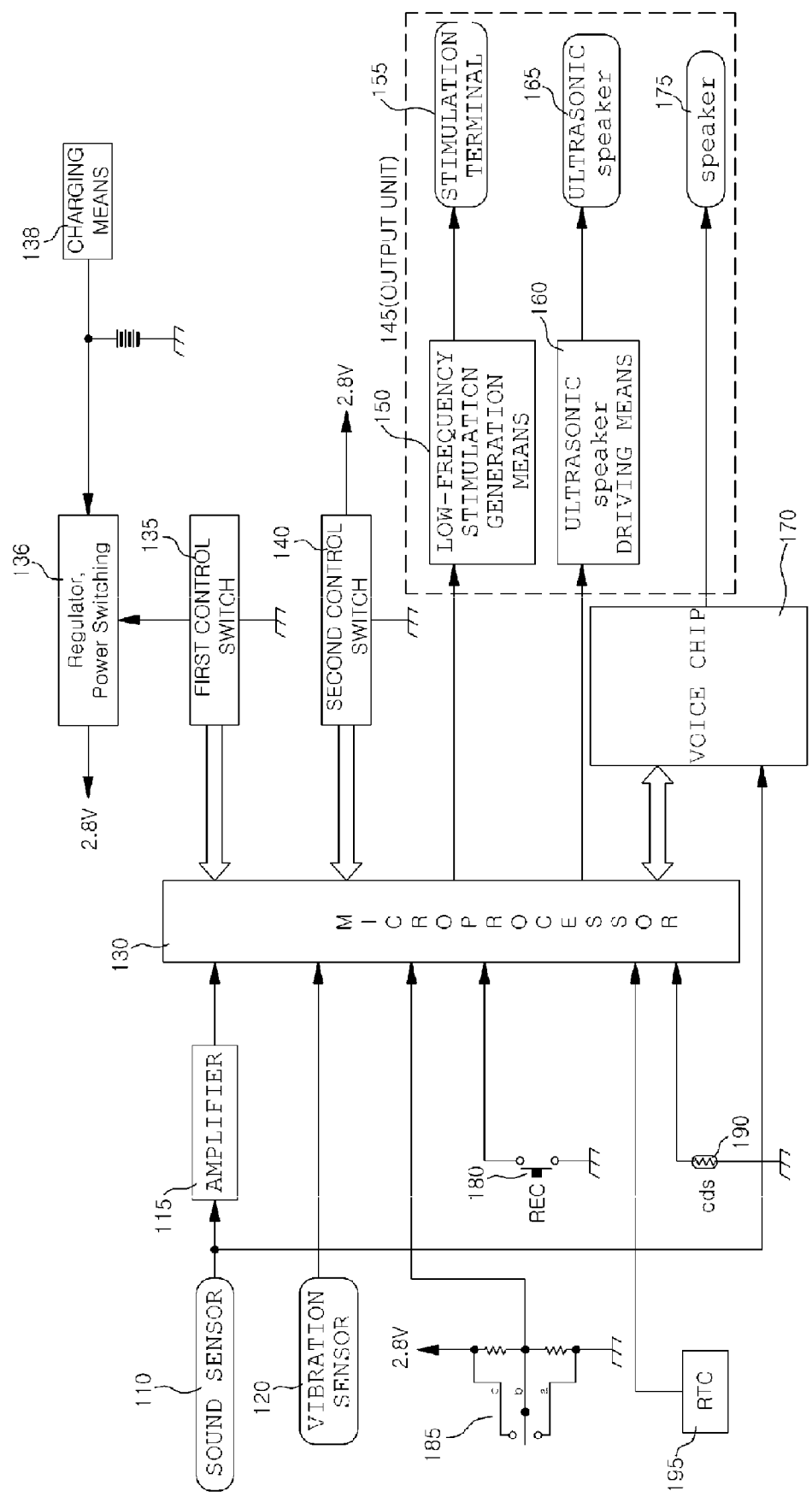
[Figure 3]

[Figure 4]
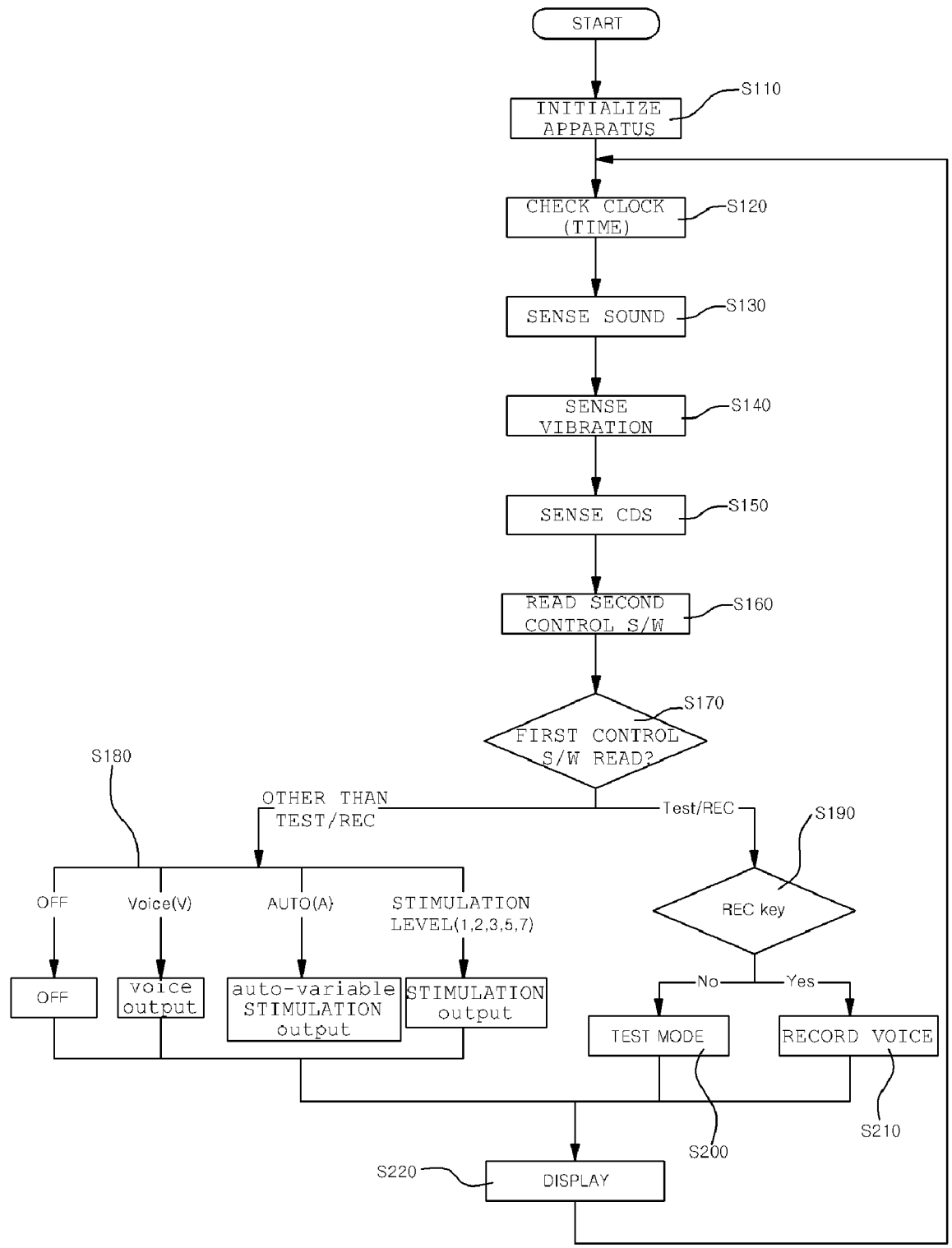

[Figure 5]
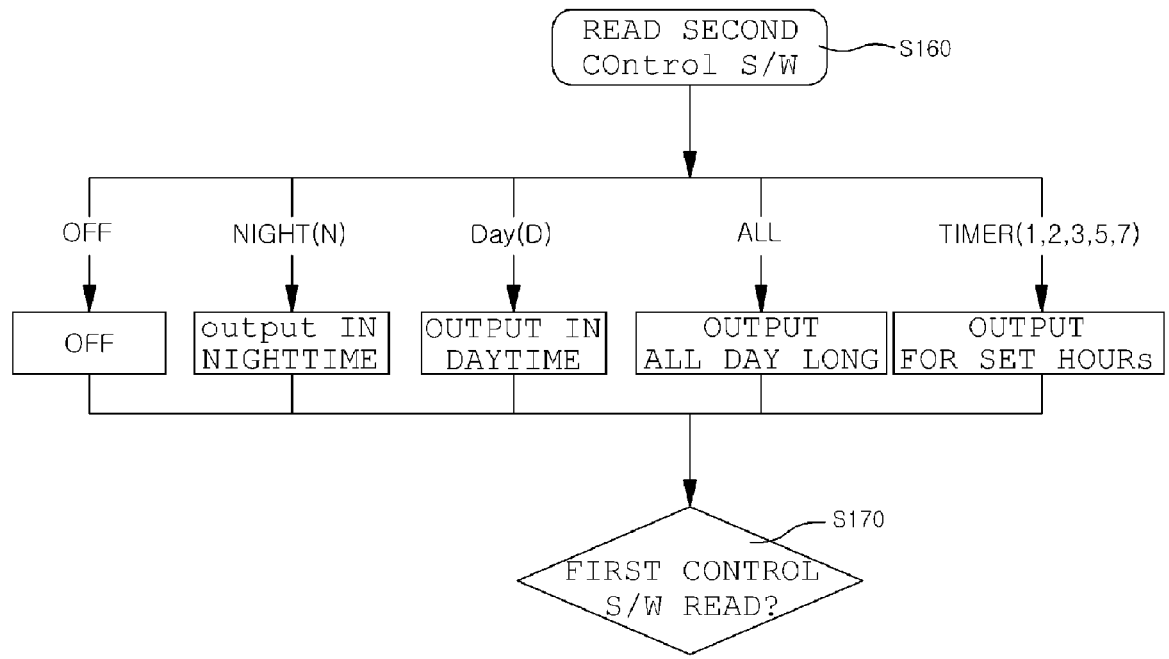

[Figure 6]
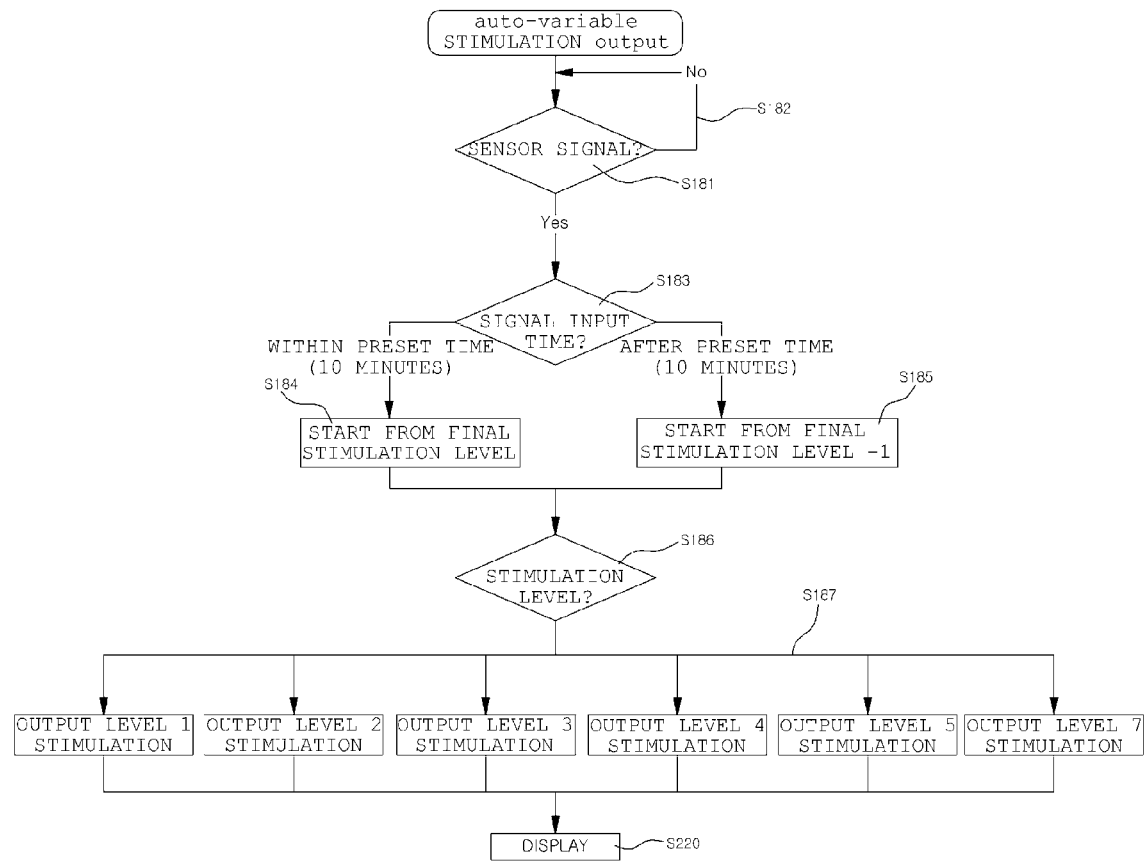

APPARATUS FOR PREVENTING ANIMAL FROM BARKING AND METHOD OF CONTROLLING THE SAME

BACKGROUND OF THE INVENTION

1. Field of the Invention

The present invention relates, in general, to an apparatus for preventing an animal from barking and method of controlling the apparatus, and, more particularly, to an apparatus for preventing an animal from barking and method of controlling the apparatus, which can sense barking actions using both a sound sensor and a vibration sensor to prevent an animal from barking, can automatically control the intensities of sound, ultrasonic or low-frequency stimulations according to the time at which an animal barks, and can automatically control the operating time of the function of preventing an animal from barking.

2. Description of the Related Art

Modern people who live near neighbors must pay attention to their pets so as to prevent the pets from troubling their neighbors when they want to keep pets in apartment houses or cities in which people live close to their neighbors.

However, a pet's barking is transferred to neighbors through some space without being blocked, so that friction with neighbors may result. In order to solve this problem, various methods such as that of prescribing related actions as laws or that of prohibiting pets from barking by training them have been considered so as to prevent the pets from making noise.

In order to suppress the barking of pets, various technologies have been developed. A representative one of these technologies is a bark control system, which senses the bark of an animal, provides a warning to the animal in the form of a sound or vibration, and applies an electrical stimulation when the animal continues to bark even if the warning is provided. This system is disclosed in U.S. Pat. No. 5,927,233.

As shown in FIG. 1, such a conventional bark control system includes a vibration sensor 3 attached to the collar 2 of a pet dog 1 and configured to sense a vibration occurring on the neck of the pet dog, a microphone 4 for sampling surrounding sound, amplifiers 5 and 6 for amplifying the power of the vibration sensor 3 and the microphone 4, a central processing unit 7 for converting signals sampled by the microphone 4 into vectors, comparing the vectors with the vectors of sample bark signals previously stored in memory 8 in relation to whether the vectors correspond to the previously stored vectors, and outputting a bark control signal when the vectors correspond to the previously stored vectors, and a stimulation output device 9 for receiving the bark control signal from the central processing unit 7 and outputting a stimulation.

The conventional bark control system is problematic in that, since the microphone is operated by sensing a vibration occurring on the neck of an animal, the system is operated only when the vibration sensor accurately comes into contact with the vocal cords of the animal. Further, the system is also problematic in that, when the collar equipped with the vibration sensor is scratched or stimulated, the vibration sensor is operated, so that the microphone is operated, thus resulting in unnecessary power consumption.

Further, such a conventional bark control system is disadvantageous in that the period and intensity of stimulation applied to an animal are uniform, thus causing stress to the animal, and in that, when the stimulation is continuously applied, a threshold phenomenon occurs, thus deteriorating the efficiency of the bark control system and making it difficult to control the animal.

SUMMARY OF THE INVENTION

Accordingly, the present invention has been made keeping in mind the above problems occurring in the prior art, and an object of the present invention is to provide an apparatus for preventing an animal from barking and method of controlling the apparatus, which can sense barking actions using both a sound sensor and a vibration sensor so as to prevent an animal from barking, can automatically select voice, ultrasonic, and low-frequency stimulation means and automatically control the intensities of stimulations depending on the time of barking, and can automatically control the operating time of a barking prevention function according to a user's requirements.

In accordance with an aspect of the present invention, there is provided an apparatus for preventing an animal from barking, comprising a sound sensor for sensing a bark of an animal and converting the bark into an electrical signal; an amplifier for amplifying the electrical signal output from the sound sensor in a form of a digital signal; a vibration sensor for sensing a vibration occurring on a neck of the animal when the animal barks; a microprocessor for performing control such that, when signals are input from the sound sensor and the vibration sensor, preset voice, ultrasonic or low-frequency stimulation means is output, the microprocessor having an auto-variable output function of automatically varying a low-frequency stimulation intensity and a time band-based output function of outputting stimulations based on time bands, depending on a user's selection; a first control switch functioning to allow the user to optionally set a type and a stimulation intensity of the stimulation means; a second control switch functioning to allow the user to optionally set a time for which the stimulation means is operated; and an output unit for receiving control signals for the stimulation means from the microprocessor and outputting corresponding stimulations.

Preferably, the apparatus may further comprise a Recording (REC) switch functioning to record a voice of the user, which is output according to a setting of the first control switch, and a voice chip for storing a recorded voice; and a light sensor for sensing light so that the animal barking prevention apparatus is operated according to a setting of the second control switch, and a real-time clock for precisely calculating time.

Preferably, the first control switch functions to enable the stimulation means of the animal barking prevention apparatus to be selected, the first control switch comprising a first dial position set to enable the voice of the user to be output; a second dial position set to enable the low-frequency stimulation to be automatically varied and output (an auto-variable output function) according to a time at which the bark of the animal is generated; third to seventh dial positions set to enable first, second, third, fifth and seventh-level stimulations set by the user to be output according to the bark of the animal; an eighth dial position (TEST/REC) set to enable the stimulation means to be tested and the recorded voice of the user to be checked; and a ninth dial position set to enable the animal barking prevention apparatus to be turned off.

Preferably, the second control switch functions to enable an operating time of the animal barking prevention apparatus to be selected, the second control switch comprising a first dial position set to enable a function of the real-time clock to be turned off; a second dial position set to enable the animal barking prevention apparatus to be operated only in nighttime; a third dial position set to enable the animal barking prevention apparatus to be operated only in daytime; a fourth dial position set to enable the animal barking prevention apparatus to be operated all day long; and fifth to ninth dial positions set to enable the animal barking prevention apparatus to be operated for 1, 2, 3, 5, and 7 hours regardless of it being daytime or nighttime.

Preferably, the output unit comprises a speaker for converting an electrical signal played by the voice chip into a voice and outputting the voice according to a setting by the user; ultrasonic speaker driving means and an ultrasonic speaker for outputting ultrasonic waves in a band distasteful to the animal; and low-frequency stimulation generation means and a stimulation terminal for outputting the low-frequency stimulation to the animal.

In accordance with another aspect of the present invention, there is provided a method of controlling an apparatus for preventing an animal from barking, comprising the steps of a) initializing stimulation means and an operating time of the animal barking prevention apparatus; b) determining whether the operating time of the animal barking prevention apparatus has been reached; c) if it is determined at step b) that the operating time has been reached, determining whether sound is sensed by a sound sensor; d) after step c), determining whether a vibration is sensed by a vibration sensor; e) determining using a light sensor whether a current time corresponds to daytime or nighttime; f) determining whether a second control switch is operated, and then checking the operating time; g) determining a dial position selected by the first control switch; h) when a dial position other than an eighth dial position of the first control switch is determined to be selected at step g), outputting a stimulation corresponding to the selected dial position; i) when the eighth dial position of the first control switch is determined to be selected at step g), determining whether a recording (REC) switch is operated; j) if it is determined at step i) that the REC switch is not operated, testing the stimulation means of the animal barking prevention apparatus; k) if it is determined at step i) that the REC switch is operated, recording a voice of the user; l) displaying results of steps h), j) and k), and returning to step b).

Preferably, step f) of determining whether the second control switch is operated, and then checking the operating time is configured to perform control such that, when the second control switch is set to a first dial position, a function of a real-time clock is turned off, and then a function of checking the operating time is turned off, when the second control switch is set to a second dial position, the animal barking prevention apparatus is operated only in nighttime, when the second control switch is set to a third dial position, the animal barking prevention apparatus is operated only in daytime, when the second control switch is set to a fourth dial position, the animal barking prevention apparatus is operated all day long, and when the second control switch is set to fifth to ninth dial positions, the animal barking prevention apparatus is operated for 1, 2, 3, 5, and 7 hours regardless of it being daytime or nighttime.

Preferably, step h) of, when a dial position other than the eighth dial position of the first control switch is determined to be selected at step g), outputting a stimulation corresponding to the dial position, is configured to perform control such that, when the first control switch is set to a first dial position, a recorded voice of the user is output, when the first control switch is set to a second dial position, the low-frequency stimulation is automatically varied and output (an auto-variable output function), when the first control switch is set to third to seventh dial positions, first, second, third, fifth and seventh-level stimulations set by the user are respectively output, and when the first control switch is set to a ninth dial position, power of the animal barking prevention apparatus is turned off and the set auto-variable output function is initialized.

Preferably, at step f), the auto-variable output function is controlled using a method comprising the steps of f1) sensing a bark of an animal using a sound sensor or a vibration sensor; f2) waiting for the bark of the animal to be sensed when a bark is not sensed at step f1); f3) checking a time at which a signal is input when the bark is sensed at step f1); f4) when the signal input time comes within 10 minutes from input of a final signal at step f3), setting a final low-frequency stimulation level to a current low-frequency stimulation level and outputting a low-frequency stimulation while a level thereof gradually increases from the current low-frequency stimulation level; f5) when the signal input time comes more than 10 minutes after the input of the final signal at step f3), setting a low-frequency stimulation level lower than the final low-frequency stimulation level to a current low-frequency stimulation level, and outputting a low-frequency stimulation while a level thereof gradually increases from the current low-frequency stimulation level; f6) determining low-frequency stimulation levels at step f4) and f5), and outputting the current low-frequency stimulation level; and f7) displaying the low-frequency stimulation level output at step f6).

As described above, the apparatus for preventing an animal from barking and method of controlling the apparatus according to the present invention sense barking actions using both a sound sensor and a vibration sensor to prevent an animal from barking, thus more accurately acquiring information about the barking actions of the animal.

Further, the barking action of an animal can be controlled by selecting voice, ultrasonic and low-frequency stimulation means according to a user's convenience.

Furthermore, the intensity of stimulation can be automatically controlled according to the time at which an animal barks, and an animal barking prevention function can be controlled so that it is activated in the daytime, in the nighttime, or for a specific period of time.

BRIEF DESCRIPTION OF THE DRAWINGS

FIG. 1 is a conventional bark control system for determining whether an animal barks by operating a microphone using vibration occurring on the neck of an animal;

FIG. 2a is a perspective view showing an apparatus for preventing an animal from barking according to an embodiment of the present invention;

FIG. 2b is a front view showing the apparatus for preventing an animal from barking according to an embodiment of the present invention;

FIG. 2c is a rear view showing the apparatus for preventing an animal from barking according to an embodiment of the present invention;

FIG. 2d is a plan view showing the apparatus for preventing an animal from barking according to an embodiment of the present invention;

FIG. 2e is a bottom view showing the apparatus for preventing an animal from barking according to an embodiment of the present invention;

FIG. 3 is a block diagram showing the apparatus for preventing an animal from barking according to an embodiment of the present invention;

FIG. 4 is a flowchart showing a method of controlling the apparatus for preventing an animal from barking according to an embodiment of the present invention;

FIG. 5 is a flowchart showing a method of determining whether a second control switch is operated, and then checking an operating time in FIG. 4; and FIG. 6 is a flowchart showing a method of controlling the auto-variable output function of FIG. 6.

DESCRIPTION OF THE PREFERRED EMBODIMENTS

The above and other objects, features and advantages of the present invention will be more clearly understood from the following detailed description taken in conjunction with the accompanying drawings. Hereinafter, embodiments of an apparatus for preventing an animal from barking and method of controlling the apparatus according to the present invention will be described in detail with reference to the attached drawings. Terms, not especially defined in the present specification, are terms well-known to those skilled in the art and are defined according to common knowledge.

FIG. 2a is a perspective view of an apparatus 100 for preventing an animal from barking (hereinafter referred to as an 'animal barking prevention apparatus') according to an embodiment of the present invention, FIG. 2b is a front view of FIG. 2a, FIG. 2c is a rear view of FIG. 2a, FIG. 2d is a plan view of FIG. 2a, FIG. 2e is a bottom view of FIG. 2a, and FIG. 3 is a block diagram showing the animal barking prevention apparatus 100 according to an embodiment of the present invention.

The animal barking prevention apparatus 100 according to the present invention shown in the drawings senses barking actions of an animal using a sound sensor 110 and a vibration sensor 120 to prevent an animal from barking, and includes an auto-variable output function of automatically selecting a voice, ultrasonic or low-frequency stimulation depending on the time of barking and controlling the intensity of the selected stimulation, and a time band-based output function of selecting the operating time of a barking restriction signal as a user's desired time band such as the daytime, nighttime or a specific time band, and automatically controlling the time for which stimulation is provided.

The animal barking prevention apparatus 100 will be described in detail with reference to FIGS. 2a to 3. The animal barking prevention apparatus 100 includes the sound sensor 110, an amplifier 115, the vibration sensor 120, a microprocessor 130, a first control switch 135, a second control switch 140, and an output unit 145. The sound sensor 110 senses the bark of an animal and converts the bark into an electrical signal. The amplifier 115 amplifies the electrical signal output from the sound sensor 110 into a digital signal. The vibration sensor 120 senses a vibration occurring on the neck of the animal when the animal barks. The microprocessor 130 performs control such that, when signals are input from the sound sensor 110 and the vibration sensor 120, a voice stimulation signal, an ultrasonic stimulation signal, or a low-frequency stimulation signal, which is preset, is output. The microprocessor 130 is provided with an auto-variable output function of automatically varying the intensity of a low-frequency stimulation and a time band-based output function of outputting stimulations based on time bands depending on the user's selection. The first control switch 135 functions to allow the user to optionally set the type and intensity of a stimulation signal. The second control switch 140 functions to allow the user to optionally set the time for which a stimulation signal is operated. The output unit 145 receives stimulation signals from the microprocessor 130 and outputs corresponding stimulations.

The animal barking prevention apparatus 100 further includes a recording (REC) switch 180, a voice chip 170, a light sensor 190, and a Real-Time Clock (RTC) 195. The REC switch 180 functions to record the voice of the user which is output according to the setting of the first control switch 135. The voice chip 180 stores the recorded voice. The light sensor 190 senses light so that the animal barking prevention apparatus 100 is operated according to the setting of the second control switch 140. The real-time clock 195 accurately calculates time. The light sensor 190 is mainly implemented as a Cds electric photometer which is a photometer for measuring the intensity of light using electric resistance. The RTC 195 is a clock Integrated Circuit (IC) for accurately calculating time to distinguish daytime from nighttime.

The sound sensor 110 is a device for sensing the bark of an animal, and may be implemented as a condenser microphone or the like. The amplifier 115 is a device for amplifying the small output signal of the sound sensor 110 into a digital signal enabling the microprocessor 130 to be operated. The vibration sensor 120 functions to sense the vibration of the neck of the animal because a bark and a neck vibrating phenomenon occur together when the animal barks. A tilt sensor is mainly used for such a vibration sensor 120. In the case where the neck of the animal vibrates when the animal barks, metal beads provided in the vibration sensor 120 turn on two electrodes.

The microprocessor 130 functions to control all functions of the animal barking prevention apparatus 100. In particular, in the case where signals from the sound sensor 110 and the vibration sensor 130 are input when the animal barks, the microprocessor 130 functions to output a stimulation signal selected according to the setting of the first control switch 135.

In this case, the first control switch 135 functions to select the stimulation means of the animal barking prevention apparatus 100. The first control switch 135 includes a first dial position set to enable the user's voice to be output, a second dial position set to enable a low-frequency stimulation to be automatically varied and output (an auto-variable output function) according to the time at which the bark of the animal is generated, third to seventh dial positions set to enable first, second, third, fifth and seventh-level stimulation intensities set by the user to be output according to the bark of the animal, an eighth dial position TEST/REC set to enable the stimulation means to be tested and the recorded voice of the user to be checked, and a ninth dial position set to enable the animal barking prevention apparatus 100 to be turned off.

In the case where the first control switch 135 is set to the first dial position, when the animal barks, and sensed signals are generated by the sound sensor 110 and the vibration sensor 120, voice is output. For example, when the voice "No" is recorded in the voice chip 170, the voice "No" is output through the speaker 175 whenever the signals are received from the sensors 110 and 120.

In the case where the first control switch 135 is set to the second dial position, when sensed signals are generated by the sound sensor 110 and the vibration sensor 120, a first-level low-frequency stimulation is generated. Subsequently, when the sensed signals are generated again, a low-frequency stimulation is output while the level thereof increases to a second level, third level, . . . , seventh level. When sensed signals are received again within 10 minutes from the input of a final sensed signal, the low-frequency stimulation is output while the level thereof gradually increases from the final low-frequency stimulation level. For example, when the animal continuously barks and a fifth-level low-frequency stimulation is output, and then barks again within 10 minutes, the low-frequency stimulation is output while the level thereof increases from the fifth level.

When sensed signals are input again more than 10 minutes after the input of the final sensed signal, a low-frequency stimulation, the level of which is lower than the final low-frequency stimulation by one level, is output. For example, when the animal continuously barks and a fifth-level low-frequency stimulation is output, and then barks again after 10 minutes, the low-frequency stimulation is output while the level thereof increases from the fourth level. When the apparatus is turned on again after being turned off, the apparatus is initialized, and the low-frequency stimulation is output while the level thereof increases from the first level.

In the case where the first control switch 135 is set to an eighth dial position, test mode is executed in such a way that, when initial signals are generated by the sound sensor 110 and the vibration sensor 120, voice (for example: 'No') is output, and that, when signals are input again within 30 seconds, a first-level low-frequency stimulation is output. Further, when signals are input once again within 30 seconds, a second-level low-frequency stimulation is output, and the stimulation is output while the level thereof increases up to the seventh level. When signals are input again after 30 seconds, the apparatus is initialized, and the voice of the user is output. A test method may be implemented by vibrating the product of this apparatus (the operation of the vibration sensor 120), by clapping their hands close to the sound sensor 110, and by making a sound using the mouth. Recording mode is executed in such a way that one speaks close to the sound sensor 110 while pressing the REC switch 180 (red LED ON), thus enabling the voice to be recorded. For example, when the user speaks "Don't bark" while pressing the REC switch 180, and then releases the REC switch 180, the red LED is turned off. When recording is tested in test mode, the state of recording can be checked.

In the case where the first control switch 135 is set to the ninth dial position, the animal barking prevention apparatus 100 is turned off. In this case, the auto-variable output function for low-frequency stimulations is initialized.

Further, the second control switch 140 includes a first dial position functioning to enable the operating time of the animal barking prevention apparatus 100 to be selected and turn off the function of the real-time clock 195, a second dial position set to enable the animal barking prevention apparatus 100 to be operated only at nighttime, a third dial position set to enable the animal barking prevention apparatus 100 to be operated only in the daytime, a fourth dial position set to enable the animal barking prevention apparatus 100 to be operated all day long, and fifth to ninth dial positions set to enable the animal barking prevention apparatus 100 to be operated for 1, 2, 3, 5 and 7 hours regardless of it being daytime or nighttime.

The REC switch 180 is configured to perform a recording function, and is configured such that, when the user sets the first control switch 135 to the eighth dial position (TEST/REC), and speaks to the sound sensor 110 while pressing the REC switch 180, voice is recorded in the voice chip 170 under the control of the microprocessor 130. The voice chip 170 outputs the recorded voice or records a voice signal input from the sound sensor 110 under the control of the microprocessor 130. The playing and the recording may be repeated several times.

The output unit 145 includes the speaker 175 for converting an electrical signal played by the voice chip 170 according to the setting by the user, into voice, an ultrasonic speaker driving means 160 and an ultrasonic speaker 165 for outputting ultrasonic waves in a band distasteful to the animal, and a low-frequency stimulation means 150 and stimulation terminals 155 for outputting low-frequency stimulations to the animal. The band of ultrasonic waves distasteful to the animal ranges from 17 kHz to 23 kHz. These ultrasonic waves are not uniformly output through the ultrasonic speaker 165, and frequencies are added or subtracted at periods of 1 to 3 seconds as in the case of a siren, so that various bands of ultrasonic waves distasteful to animals having various body shapes and kinds are selectively output to the animals, thus preventing the animals from barking. The low-frequency stimulation means 150 is a high-voltage stimulation generation means for applying low-frequency stimulations to the animal, and can be implemented as a transformer. The stimulation terminals 155 are electrodes for applying the low-frequency stimulations generated by the low-frequency stimulation means 150 to the animal.

Further, a regulator & power switching means 136 is designed to supply power by controlling the control terminal of a regular IC using the first control switch 135, which is of a rotary switch type, and is configured to perform a power switching function.

Since the battery of the animal barking prevention apparatus is a secondary battery, a charging means 138 is required, and the required charging time is at least 10 hours.

A function convert switch 185 which is separately provided can be set to enable three types of output, that is, voice output, ultrasonic output, and low-frequency stimulation output. The setting of low-frequency stimulation output is conducted in such a way that, when an animal stays alone in the home and bites toilet tissue, socks or shoes, and, at this time, the neck of the animal excessively vibrates to the left and right, the vibration sensor 120 senses the vibration of the animal to enable a low-frequency stimulation to be generated. That is, in the case of a barking prevention function, the stimulation means is output only when both the sound sensor 110 and the vibration sensor 120 sense signals. However, when the low-frequency stimulation output of the function convert switch 185 is set, writhing or neck vibration of the animal when it is biting occurs. When regular vibrations occur three or more times, a low-frequency stimulation is output.

Next, a basic method of controlling the animal barking prevention apparatus 100 according to the present invention will be described with reference to FIG. 4. That is, the method includes the steps S110 to S220. At step S110, the stimulation means and the operating time of the animal barking prevention apparatus 100 are initialized. Whether the operating time of the animal barking prevention apparatus 100 has been reached is determined at step S120. When the operating time has been reached at step S120, whether sound has been sensed by the sound sensor 110 is determined at step S130. After step S130, whether a vibration has been sensed by the vibration sensor 120 is determined at step S140. Whether the current time corresponds to the daytime or nighttime is determined by the light sensor 190 at step S150. Whether the second control switch 140 is operated is determined, and the operating time of the apparatus is checked at step S160. Which dial position has been selected by the first control switch 135 is determined at step S170. When a dial position other than the eighth dial position of the first control switch 135 is determined to be selected at step S170, a stimulation corresponding to the selected dial position is output at step S180. When the eighth dial position is determined to be selected at step S170, whether the REC switch 180 is operated is determined at step S190. If it is determined at step S190 that the REC switch 180 is not operated, the stimulation means of the animal barking prevention apparatus 100 is tested at step S200. If it is determined at step S190 that the REC switch 180 is operated, the voice of the user is recorded at step S210. The results of steps S180, S200, and S210 are displayed, and the process returns to step S120 at step S220.

Step S160 of determining whether the second control switch 140 is operated, and checking the operating time of the apparatus will be described with reference to FIG. 5. In detail, when the second control switch 140 is set to the first dial position, and then the function of the real-time clock 195 is turned off, the function of checking the operating time is turned off. When the second control switch 140 is set to the second dial position, the barking prevention apparatus is controlled such that it is operated only in the nighttime. When the second control switch 140 is set to the third dial position, the barking prevention apparatus is controlled such that it is operated only in the daytime. When the second control switch 140 is set to the fourth dial position, the barking prevention apparatus is controlled such that it is operated all day long. When the second control switch 140 is set to the fifth to ninth dial positions, the barking prevention apparatus is controlled such that it is operated for 1, 2, 3, 5 and 7 hours regardless of it being daytime or nighttime.

Further, step S180 of, when a dial position other than the eighth dial position of the first control switch 135 is determined to be selected at step S170, outputting a stimulation corresponding to the selected dial position will be described in detail with reference to FIG. 4. In detail, when the first control switch 135 is set to the first dial position, control is performed such that the recorded voice of the user is output. When the first control switch 135 is set to the second dial position, control is performed such that a low-frequency stimulation is automatically varied and output (an auto-variable output function). When the first control switch 135 is set to the third to seventh dial positions, control is performed such that first, second, third, fifth and seventh-level low-frequency stimulations set by the user are respectively output. When the first control switch 135 is set to the ninth dial position, control is performed such that the power of the animal barking prevention apparatus 100 is turned off, and the set auto-variable output function is also initialized.

Referring to FIGS. 4 to 6, the method of controlling the auto-variable output function at step S180 includes steps S181 to S220. At step S181, the bark of an animal is sensed by the sound sensor 110 or the vibration sensor 120. When the bark is not sensed at step S181, the barking prevention apparatus waits for the bark to be sensed at step S182. When the bark is sensed at step S182, the time at which a signal is input is checked at step S183. When the signal input time comes within 10 minutes from the input of the final signal at step S183, the final low-frequency stimulation level is set to a current low-frequency stimulation level, and the low-frequency stimulation is output while the level thereof gradually increases at step S184. When the signal input time comes more than 10 minutes after the input of the final signal at step S183, a low-frequency stimulation level lower than the final low-frequency stimulation level is set to the current low-frequency stimulation level, and the low-frequency stimulation is output while the level thereof gradually increases at step S185. The low-frequency stimulation levels selected at step S184 and step S185 are determined at step S186, and the current low-frequency stimulation level is output at step S187. The low-frequency stimulation level output at step S187 is displayed at step S220.

As described above, the apparatus for preventing an animal from barking and method of controlling the apparatus according to the present invention sense barking actions using both a sound sensor and a vibration sensor to prevent an animal from barking, thus more accurately acquiring information about the barking actions of the animal.

Further, the barking action of an animal can be controlled by selecting voice, ultrasonic and low-frequency stimulation means according to a user's convenience.

Furthermore, the intensity of stimulation can be automatically controlled according to the time at which an animal barks, and an animal barking prevention function can be controlled so that it is activated in the daytime, in the nighttime, or for a specific period of time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Those modifications, additions and substitutions and equivalents thereof should be interpreted as being included in the scope of the present invention.

What is claimed is:

1. A method of controlling an apparatus for preventing an animal from barking, comprising the steps of:
   a) initializing stimulation means and an operating time of the animal barking prevention apparatus;
   b) determining whether the operating time of the animal barking prevention apparatus has been reached;
   c) if it is determined at step b) that the operating time has been reached, determining whether sound is sensed by a sound sensor;
   d) after step c), determining whether a vibration is sensed by a vibration sensor;
   e) determining using a light sensor whether a current time corresponds to daytime or nighttime;
   f) determining whether a second control switch is operated, and then checking the operating time;
   g) determining a dial position selected by the first control switch;
   h) when a dial position other than an eighth dial position of the first control switch is determined to be selected at step g), outputting a stimulation corresponding to the selected dial position;
   i) when the eighth dial position of the first control switch is determined to be selected at step g), determining whether a recording (REC) switch is operated;
   j) if it is determined at step i) that the REC switch is not operated, testing the stimulation means of the animal barking prevention apparatus;
   k) if it is determined at step i) that the REC switch is operated, recording a voice of the user; and
   l) displaying results of steps h), j) and k), and returning to step b).

2. The method according to claim 1, wherein step f) of determining whether the second control switch is operated, and then checking the operating time is configured to perform control such that, when the second control switch is set to a first dial position, a function of a real-time clock is turned off, and then a function of checking the operating time is turned off, when the second control switch is set to a second dial position, the animal barking prevention apparatus is operated only in nighttime, when the second control switch is set to a third dial position, the animal barking prevention apparatus is operated only in daytime, when the second control switch is set to a fourth dial position, the animal barking prevention apparatus is operated all day long, and when the second control switch is set to fifth to ninth dial positions, the animal barking prevention apparatus is operated for 1, 2, 3, 5, and 7 hours regardless of it being daytime or nighttime.

3. The method according to claim 1, wherein step h) of, when a dial position other than the eighth dial position of the first control switch is determined to be selected at step g), outputting a stimulation corresponding to the dial position, is configured to perform control such that, when the first control switch is set to a first dial position, a recorded voice of the user is output, when the first control switch is set to a second dial position, the low-frequency stimulation is automatically varied and output (an auto-variable output function), when the first control switch is set to third to seventh dial positions, first, second, third, fifth and seventh-level stimulations set by the user are respectively output, and when the first control switch is set to a ninth dial position, power of the animal barking prevention apparatus is turned off and the set auto-variable output function is initialized.

4. The method according to claim 3, wherein at step f), the auto-variable output function is controlled using a method comprising the steps of:
 f1) sensing a bark of an animal using a sound sensor or a vibration sensor;
 f2) waiting for the bark of the animal to be sensed when a bark is not sensed at step f1);
 f3) checking a time at which a signal is input when the bark is sensed at step f1);
 f4) when the signal input time comes within 10 minutes from input of a final signal at step f3), setting a final low-frequency stimulation level to a current low-frequency stimulation level and outputting a low-frequency stimulation while a level thereof gradually increases from the current low-frequency stimulation level;
 f5) when the signal input time comes more than 10 minutes after the input of the final signal at step f3), setting a low-frequency stimulation level lower than the final low-frequency stimulation level to a current low-frequency stimulation level, and outputting a low-frequency stimulation while a level thereof gradually increases from the current low-frequency stimulation level;
 f6) determining low-frequency stimulation levels at step f4) and f5), and outputting the current low-frequency stimulation level; and
 f7) displaying the low-frequency stimulation level output at step f6).

* * * * *